(12) United States Patent
Tsai et al.

(10) Patent No.: US 10,704,651 B2
(45) Date of Patent: Jul. 7, 2020

(54) LOW ROTATIONAL SPEED GEAR MODULE

(71) Applicant: Sha Yang Ye Industrial Co. Ltd., Taoyuan (TW)

(72) Inventors: Feng-Chun Tsai, Taoyuan (TW); Ming-Han Tsai, Taoyuan (TW); Chin-Fa Lu, Taoyuan (TW); Kai-Hsien Wang, Taoyuan (TW)

(73) Assignee: SHA YANG YE INDUSTRIAL CO. LTD., Taoyuan (TW)

( * ) Notice: Subject to any disclaimer, the term of this patent is extended or adjusted under 35 U.S.C. 154(b) by 211 days.

(21) Appl. No.: 15/976,657

(22) Filed: May 10, 2018

(65) Prior Publication Data

US 2019/0072156 A1    Mar. 7, 2019

(30) Foreign Application Priority Data

Sep. 5, 2017    (TW) .............................. 106213171 U (51) Int. Cl.
*F16H 1/46*    (2006.01)
*F16H 57/021*    (2012.01)
*F16H 57/031*    (2012.01)

(52) U.S. Cl.
CPC ............. *F16H 1/46* (2013.01); *F16H 57/021* (2013.01); *F16H 57/031* (2013.01)

(58) Field of Classification Search
CPC ....................................................... F16H 1/46
See application file for complete search history.

(56) References Cited

U.S. PATENT DOCUMENTS 6,033,336 A * 3/2000 Bae ........................... F16H 1/46
475/341

* cited by examiner

*Primary Examiner* — Derek D Knight
(74) *Attorney, Agent, or Firm* — Chun-Ming Shih; HDLS IPR Services (57) ABSTRACT

A low rotational speed gear module includes a fixed tube member, a rotational sleeve, a first planetary gear set, a sun gear, and a second planetary gear set. The fixed tube member includes a first inner gear. The rotational sleeve includes a second inner gear. The first planetary gear set includes a fixing plate, first planetary gears fixed to one side of the fixing plate, and a driven gear fixed to the other side of the fixing plate. The first planetary gear is engaged at one side with the sun gear and engaged at another side with the first inner gear. The second planetary gear set includes second planetary gears. The second planetary gears is engaged at one side with the driven gear and engaged at another side with the first inner gear and the second inner gear.

9 Claims, 9 Drawing Sheets

LOW ROTATIONAL SPEED GEAR MODULE

TECHNICAL FIELD

The present invention relates to a gear structure and, in particular, to a low rotational speed gear module.

BACKGROUND

A conventional planetary gear module includes an inner gear and multiple planetary gears. A sun gear is mounted on an output end of a motor, so that the power of the motor is output via the sun gear. The sun gear is inserted in the center of the inner gear. The planetary gears are interposed between the sun gear and the inner gear. Each planetary gear is engaged at one side with the sun gear and engaged at another side with the inner gear. Therefore, the output power of the motor is adjusted by the planetary gears and then transmitted to the inner gear.

However, the conventional planetary gear module does not effectively reduce a rotational speed, and also have trouble achieving a large torque or enabling a motionless state. When the inner gear is used to lift or lower a heavy object, the planetary gears can be rotated when the sun gear is not driven by the motor. The weight of the heavy object exerts a force to rotate the inner gear, and consequently, the heavy object will be pulled down at high speed by its own weight after the heavy object arrives a desired position or during a process of conveying the heavy object to a lower position.

In view of this, the inventor studied various technologies and created an effective solution in the present disclosure.

SUMMARY

The present invention provides a low rotational speed gear module. The low rotational speed gear module includes a first planetary gear set and a second planetary gear set that cooperate with each other to enable a motionless state, reduce a rotational speed, increase a reduction ratio, and increase a torque.

The present invention provides a low rotational speed gear module, comprising: a fixed tube member including a first inner gear; a rotational sleeve disposed corresponding to the fixed tube member and rotatable with respect to the fixed tube member, the rotational sleeve including a second inner gear, the first inner gear and the second inner gear together defining an accommodating space inside them; a first planetary gear set received in the accommodating space, the first planetary gear set including a fixing plate, a plurality of first planetary gears fixed to one side of the fixing plate, and a driven gear fixed to the other side of the fixing plate; a sun gear disposed among the first planetary gears, each of the first planetary gears being engaged at one side with the sun gear and engaged at another side with the first inner gear, so that the driven gear is rotated by rotation of the first planetary gears; and a second planetary gear set disposed around the driven gear, the second planetary gear set including a plurality of second planetary gears, each of the second planetary gears being engaged at one side with the driven gear and engaged at another side with the first inner gear and the second inner gear, so that the rotational sleeve is rotated by rotation of the driven gear.

When the rotational sleeve is used to lift or lower an object, the second inner gear can be held stationary by the first planetary gear set and the second planetary gear set, so the object is not pulled down by its own weight, even if the object is lifted to a higher position or a driving shaft stops in operation. By this way, the low rotational speed gear module enables a motionless state and achieves a large torque.

Rotation of the second inner gear is controlled by the first planetary gear set and the second planetary gear set. In addition to that, the second inner gear has a larger circumference than a circumference of the sun gear. Therefore, the low rotational speed gear module has a low rotational speed and a high reduction ratio.

BRIEF DESCRIPTION OF THE DRAWINGS

The disclosure will become more fully understood from the detailed description and the drawings given herein below for illustration only, and thus does not limit the disclosure, wherein.

DETAILED DESCRIPTION

Detailed descriptions and technical contents of the present disclosure are illustrated below in conjunction with the accompanying drawings. However, it is to be understood that the descriptions and the accompanying drawings disclosed herein are merely illustrative and exemplary and not intended to limit the scope of the present disclosure.

Referring to FIGS. 1 to 9, the present invention provides a low rotational speed gear module 10. The low rotational speed gear module 10 includes a fixed tube member 1, a rotational sleeve 2, a first planetary gear set 3, a sun gear 4, and a second planetary gear set 5.

Referring to FIGS. 1 to 4, the fixed tube member 1 includes a first inner gear 11. In detail, the fixed tube member 1 includes an outer sleeve 12 and an inner sleeve 13 inserted inside the outer sleeve 12. The first inner gear 11 includes a first inner ring gear 121 inside the outer sleeve 12 and a second inner ring gear 131 inside the inner sleeve 13.

The fixed tube member 1 further includes a plurality of fastening elements 14, the outer sleeve 12 includes a plurality of first fastening holes 122, the inner sleeve 13 includes a plurality of second fastening holes 132, and each of the fastening elements 14 is inserted and fastened to the respective corresponding first fastening hole 122 and the respective corresponding second fastening hole 132, so that the inner sleeve 13 is inserted and fixed in the outer sleeve 12, and the inner sleeve 13 is assembled to or detached from the outer sleeve 12 easily and conveniently.

Furthermore, the fixed tube member 1 further includes a first cover plate 15 and a second cover plate 16. The outer sleeve 12 has two openings 123 at its two ends. The first cover plate 15 and the second cover plate 16 cover the two openings 123 respectively. The inner sleeve 13 is disposed between the first cover plate 15 and the first inner ring gear 121, and the rotational sleeve 2 is disposed between the second cover plate 16 and the first inner ring gear 121. Then, assembling of the low rotational speed gear module 10 is completed. The low rotational speed gear module 10 has a simple structure and allows for easy assembly.

As shown in FIGS. 1 to 4, the rotational sleeve 2 is disposed corresponding to the fixed tube member 1 and is rotatable with respect to the fixed tube member 1. The rotational sleeve 2 includes a second inner gear 21. A shaft 22 is extended from the rotational sleeve 2. The first inner gear 11 and the second inner gear 21 together define an accommodating space s inside them. The second cover plate 16 includes a second through hole 161. The shaft 22 is inserted through the second through hole 161 and exposed from the same.

As shown in FIGS. 1 to 4, the first planetary gear set 3 is received in the accommodating space s, the first planetary gear set 3 includes a fixing plate 31, a plurality of first planetary gears 32 fixed to one side of the fixing plate 31, and a driven gear 33 fixed to the other side of the fixing plate 31. The first planetary gears 32 are arranged in a circular manner at equal distances from each other, and the first planetary gears 32 are fixed to the fixing plate 31.

Referring to FIGS. 1 to 4, the sun gear 4 is disposed among the first planetary gears 32, each of the first planetary gears 32 is engaged at one side with the sun gear 4 and engaged at another side with the second inner ring gear 131 of the first inner gear 11, so that the driven gear 33 is rotated by rotation of the first planetary gears 32. The first cover plate 15 includes a first through hole 151, the sun gear 4 includes an insertion hole 41, and the first through hole 151 is disposed corresponding to the insertion hole 41.

As shown in FIGS. 1 to 4, the second planetary gear set 5 is disposed around the driven gear 33. The second planetary gear set 5 includes a plurality of second planetary gears 51. Each of the second planetary gears 51 is engaged at one side with the driven gear 33 and engaged at another side with the first inner ring gear 121 in the first inner gear 11 and with the second inner gear 21, so that the rotational sleeve 2 is rotated by rotation of the driven gear 33.

The second planetary gear set 5 further includes two clamping plates 52, the second planetary gears 51 are arranged in a circular manner at equal distances from each other, and the second planetary gears 51 are interposed between the two clamping plates 52 and are pivotally connected to the two clamping plates 52. One of the clamping plates 52 includes an open hole 521, and the driven gear 33 is inserted in the open hole 521.

The low rotational speed module 10 further includes one or multiple bearings 6. The bearing 6 is clamped between an inner surface of the second through hole 161 and the shaft 22. The bearing 6 facilitates smooth rotation of the shaft 22 with respect to the inner surface of the second through hole 161.

Figure 1:
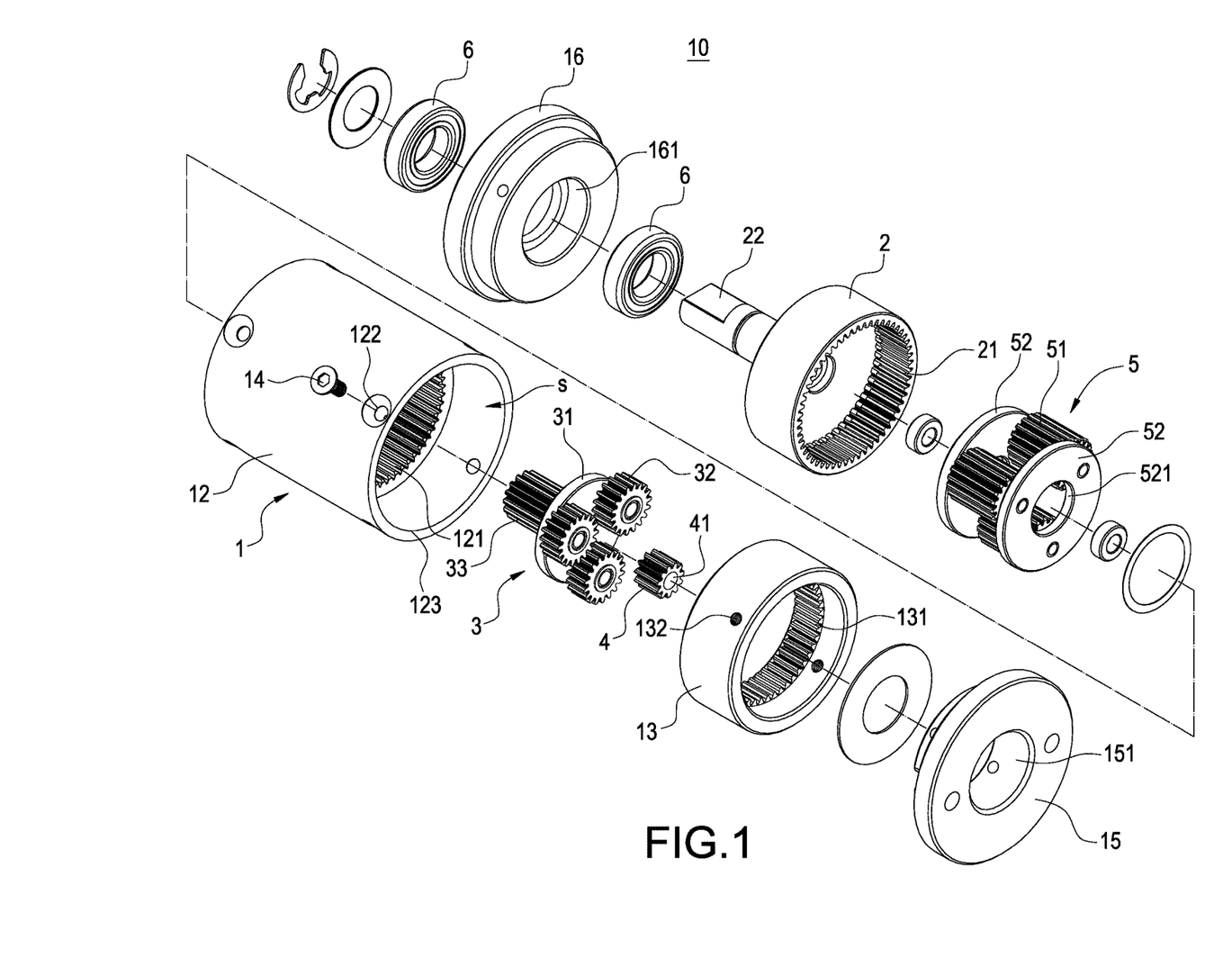
FIG. 1 is a perspective exploded view of a low rotational speed gear module according to the present invention.
Figure 2:
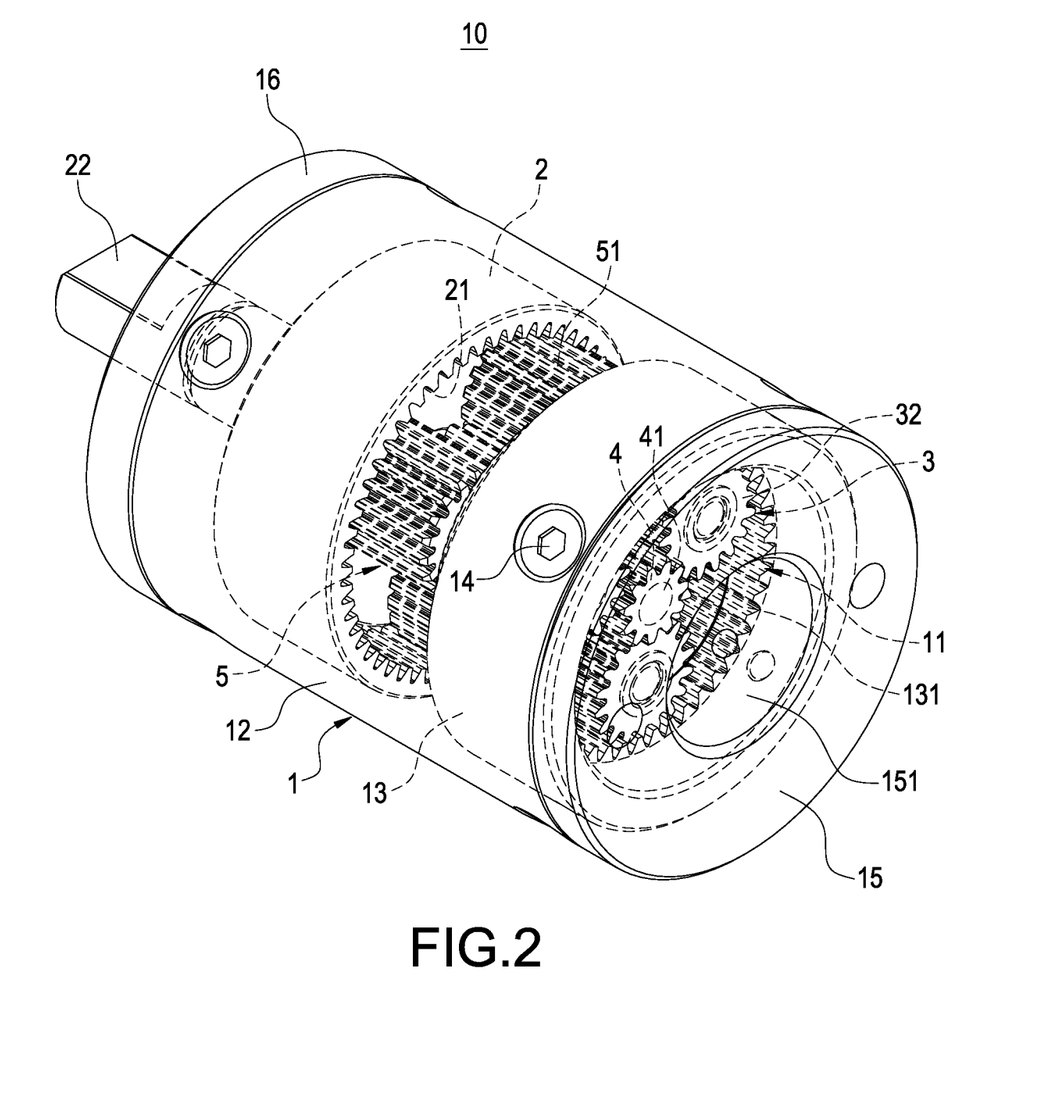
FIG. 2 is a perspective assembled view of the low rotational speed gear module according to the present invention.
Figure 3:
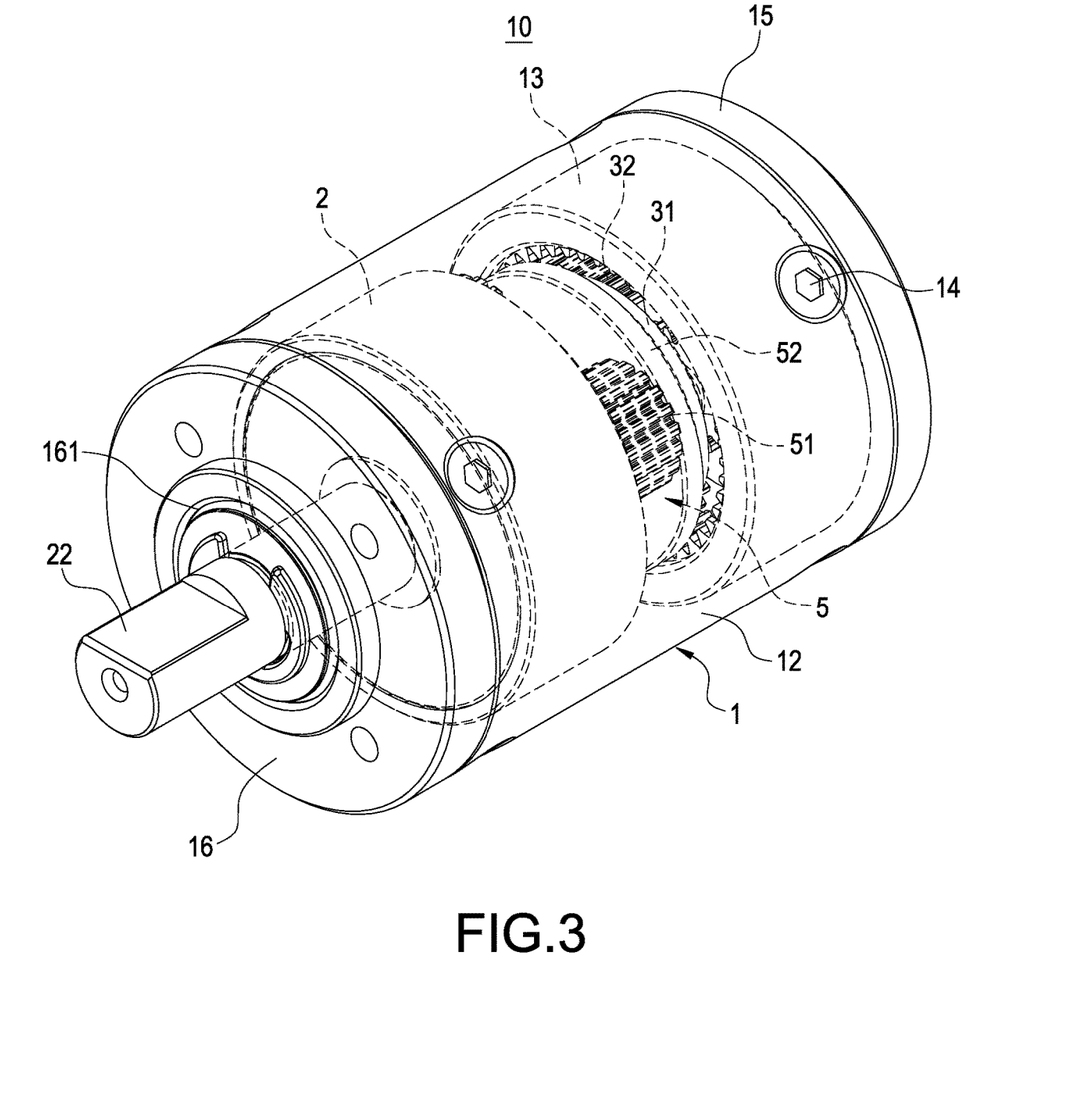
FIG. 3 is another perspective assembled view of the low rotational speed gear module.
Figure 4:
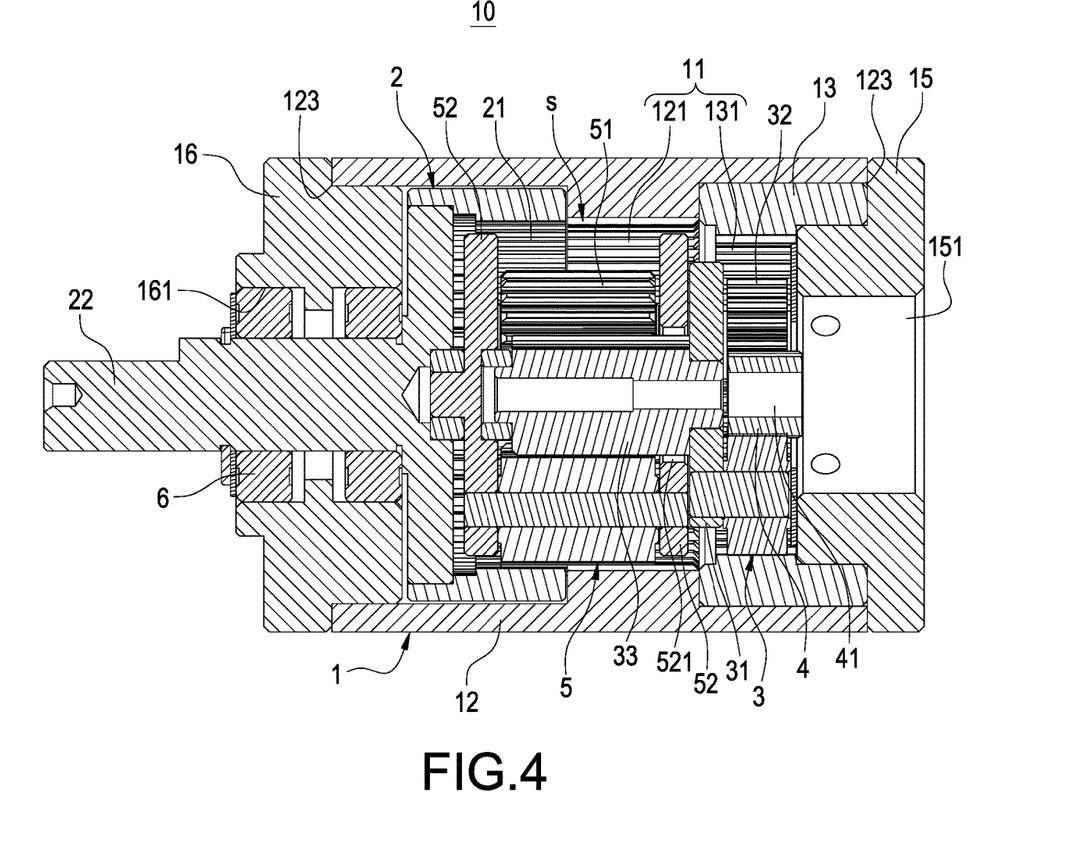
FIG. 4 is a cross-sectional view of the low rotational speed gear module.
Figure 5:
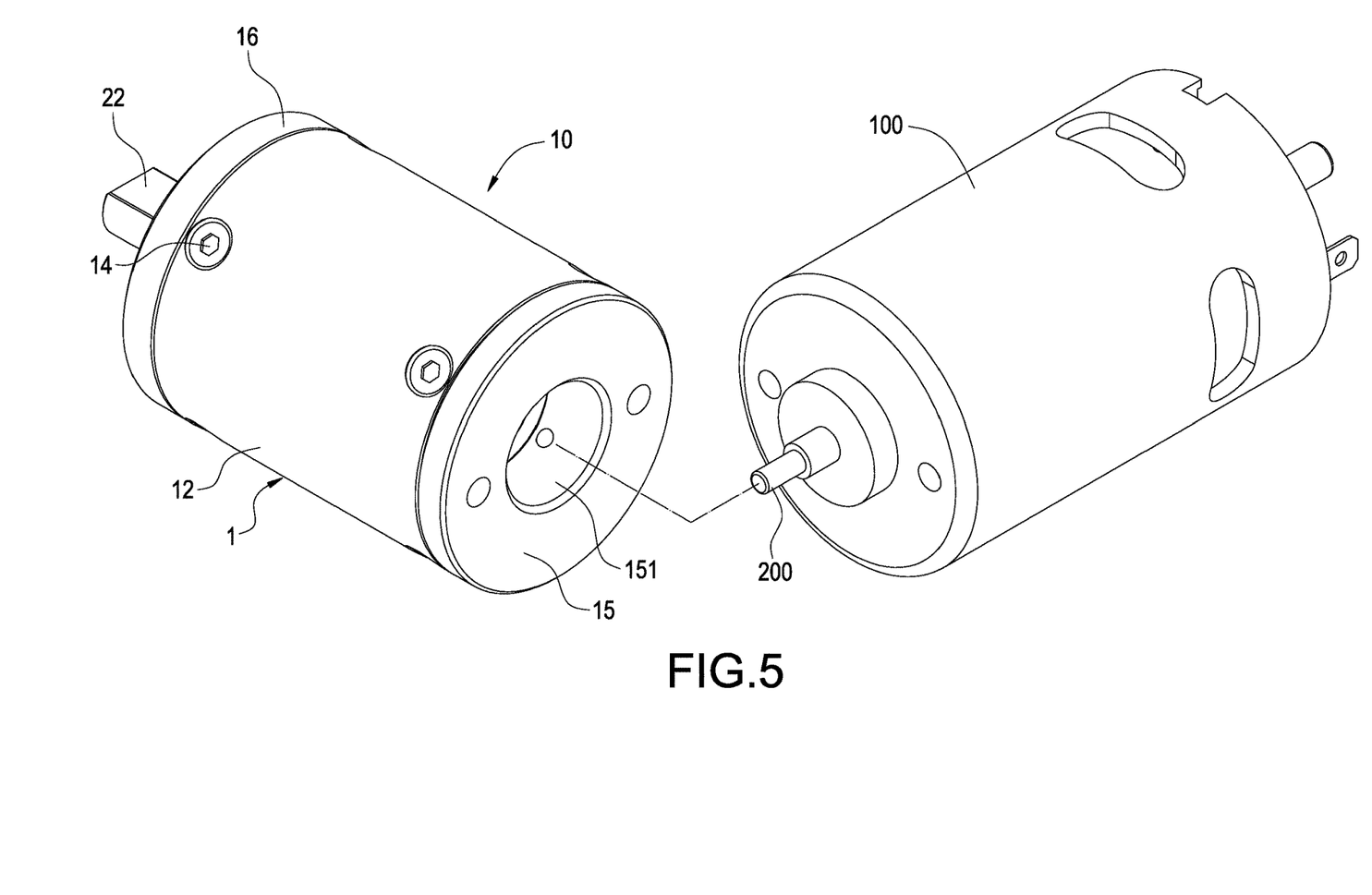
FIG. 5 is a schematic view illustrating the low rotational speed gear module in use.
Figure 6:
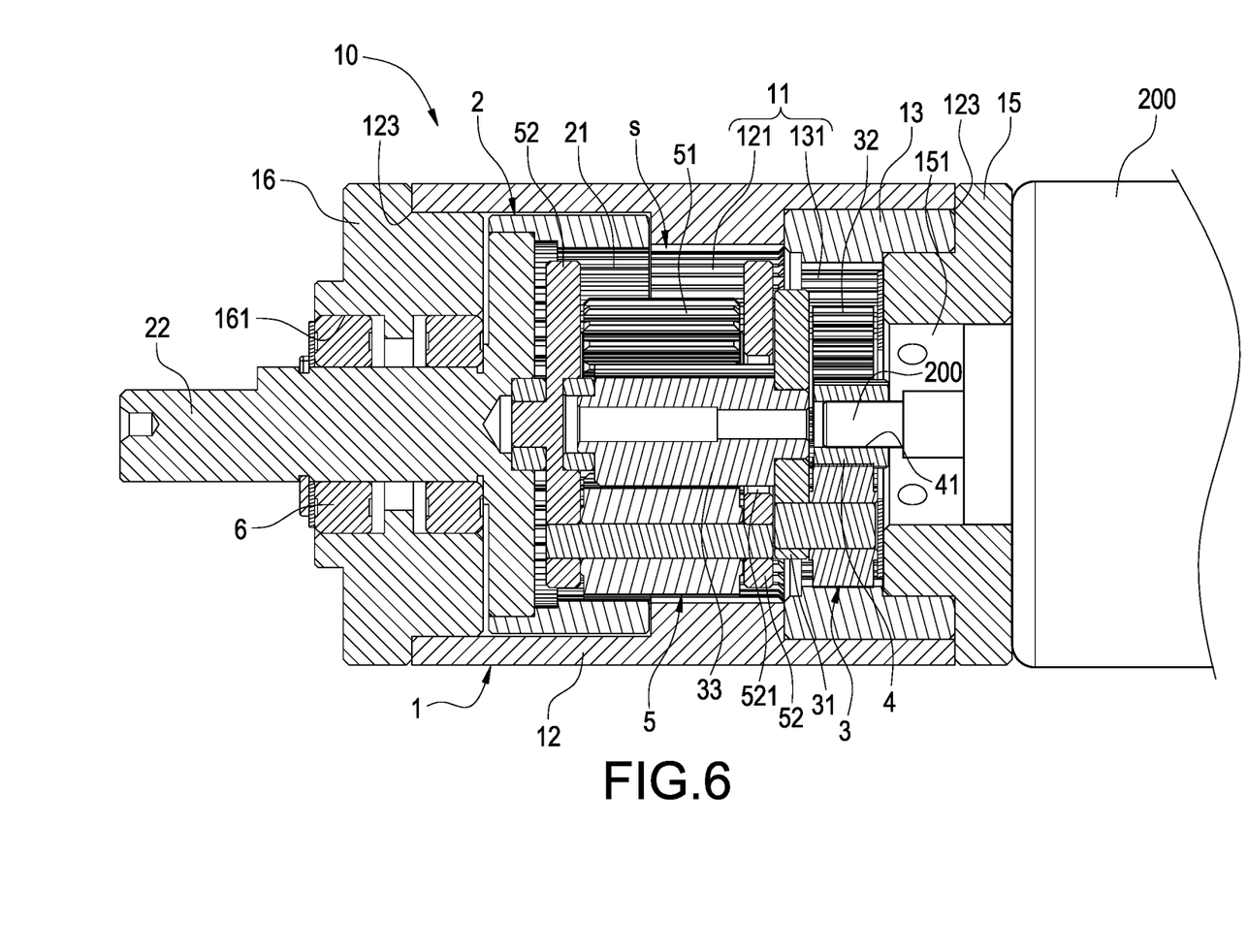
FIG. 6 is another schematic view illustrating the low rotational speed gear module in use.
Figure 7:
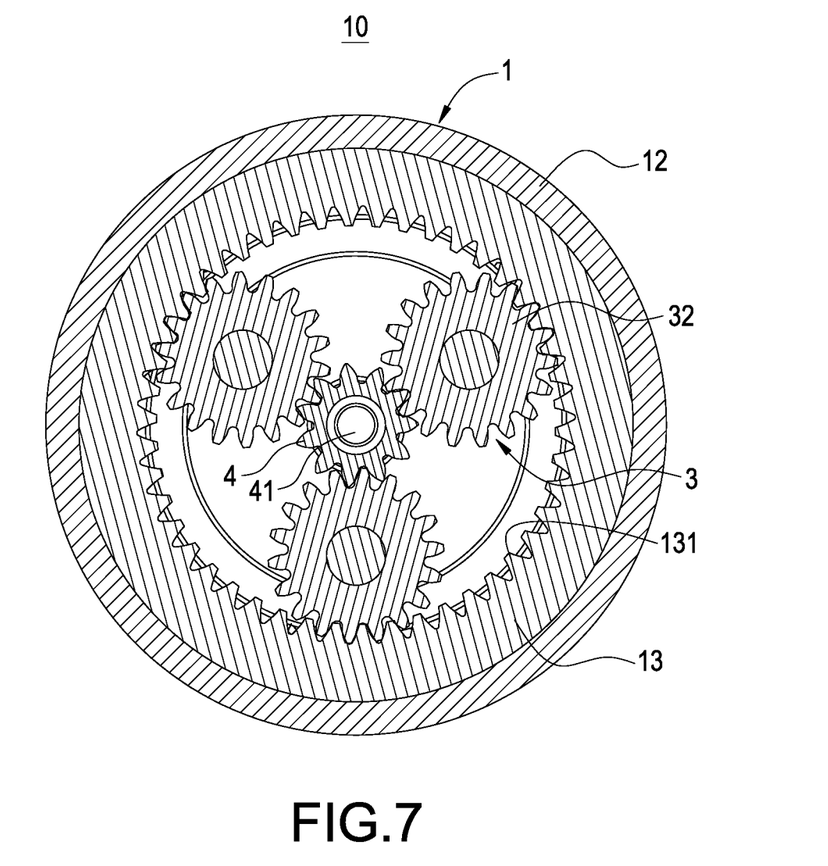
FIG. 7 is a partial cross-sectional view illustrating the low rotational speed gear module.
Figure 9:
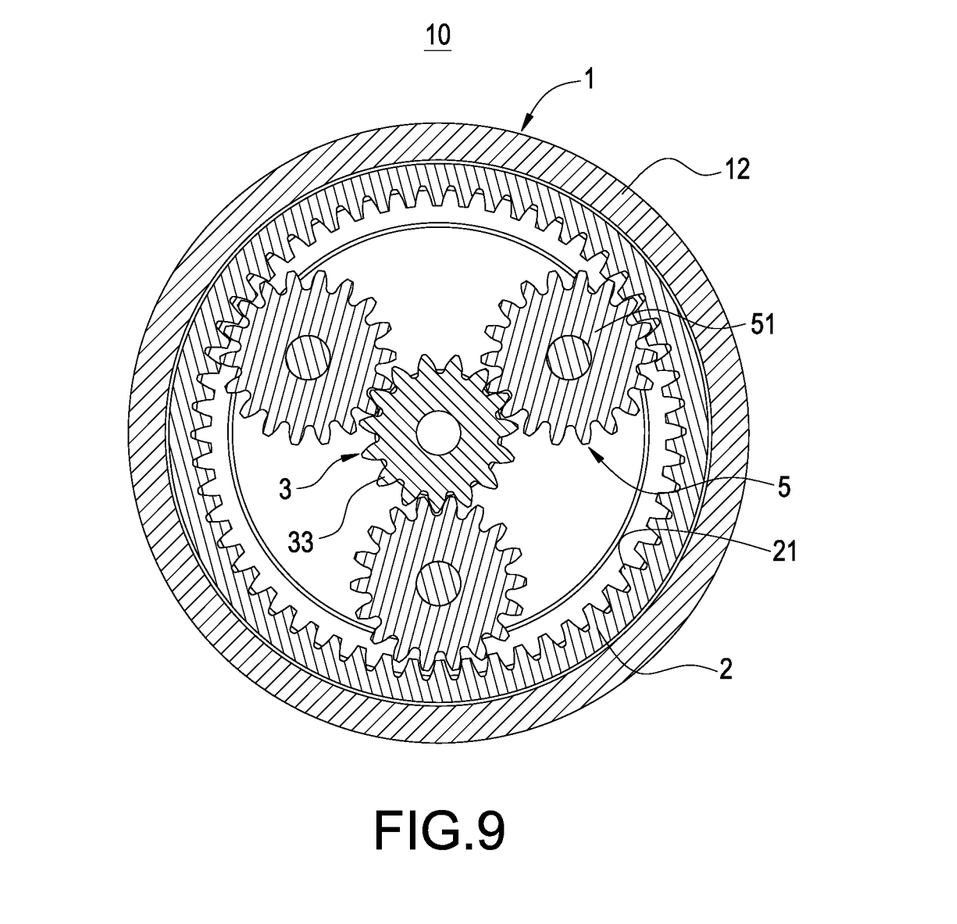
FIG. 9 is still another partial cross-sectional view illustrating the low rotational speed gear module.

Please refer to FIGS. 5 and 9 which are schematic views of the low rotational speed gear module 10 in use. As shown in FIGS. 5 to 7, a driving shaft 200 of a motor 100 is inserted into the first through hole 151 to be fixed to the sun gear 4. The driving shaft 200 drives the sun gear 4 which drives the first planetary gears 32 engaged with the sun gear 4. The second inner ring gear 131 is immobile, and the first planetary gear 32 is engaged at one side with the sun gear 4 and engaged at another side with the second inner ring gear 131 in the first inner gear 11, so the first planetary gears 32 are driven by the sun gear 32. The first planetary gears 32 are fixed to one side of the fixing plate 31, and the driven gear 33 is fixed to the other side of the fixing plate 31, so that the first planetary gears 32, the fixing plate 31 and the driven gear 33 are rotated together.

Figure 8:
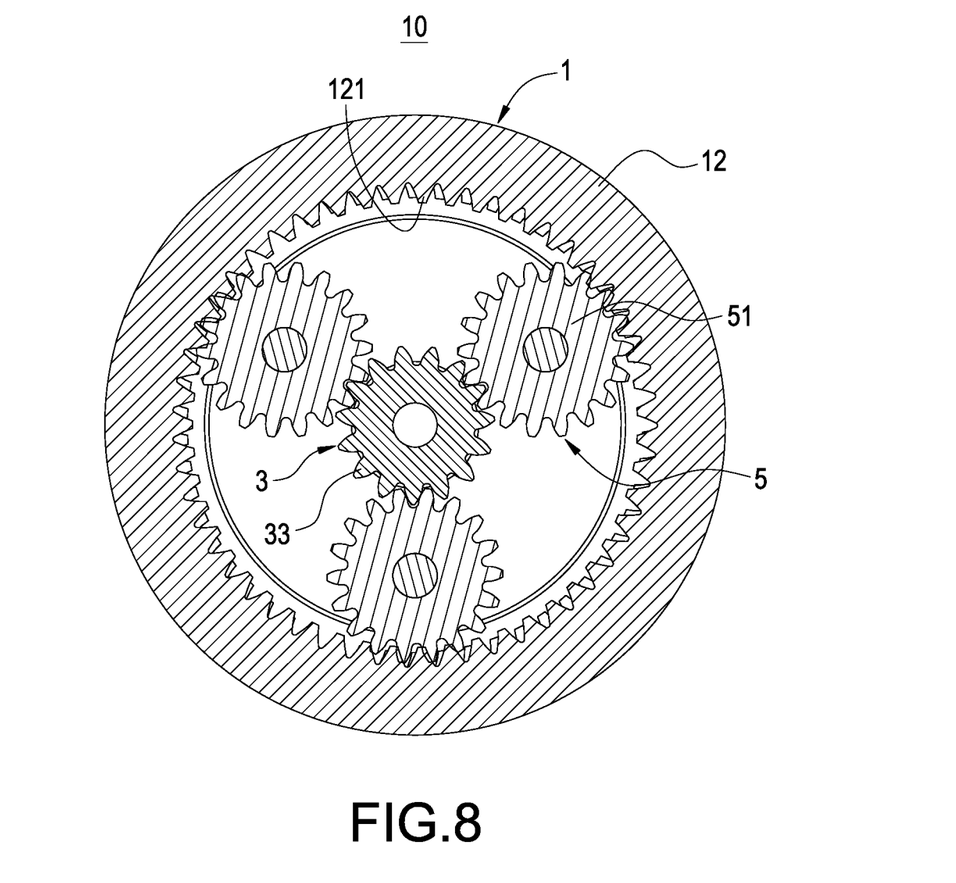
FIG. 8 is another partial cross-sectional view illustrating the low rotational speed gear module.

Furthermore, referring to FIGS. 5, 6 and 8, the second planetary gear 51 is engaged at one side with the driven gear 33 and engaged at another side with the first inner ring gear 121. The driven gear 33 is rotatable, but the first inner ring gear 121 is not rotatable (i.e. immobile), so that the second planetary gears 51 are rotated by rotation of the driven gear 33.

As shown in FIGS. 5, 6 and 9, the second planetary gear 51 is engaged at one side with the driven gear 33 and engaged at another side with the second inner gear 21. The driven gear 33 is rotatable, and the second planetary gear 51 is also rotatable, and thereby driving the second inner gear 21 to drive rotation of the shaft 22 of the rotational sleeve 2.

When the sun gear 4 and the driving shaft 200 are not rotated, the first planetary gear 32 is not rotatable since it is engaged with the sun gear 4 and the second inner ring gear 131. When the first planetary gear 32 is held stationary, the driven gear 33 is also held stationary, and the second planetary gear 51 is also held stationary due to its engagement with the driven gear 33 and the first inner ring gear 121. As a result, the second inner gear 21 and the rotational sleeve 2 are also held stationary due to their engagement with the second planetary gear 51.

As a result, when the shaft 22 of the rotational sleeve 2 is used to carry an object to go up or down, the weight of the object exerts a force to the second inner gear 21, but the second inner gear 21 is stopped from rotation by the first planetary gear set 3 and the second planetary gear set 5. Therefore, when the object is lifted up or the driving shaft 200 stops in operation, the second inner gear 2 is not rotated by the weight of the object, so the object is not pulling down by its own weight. Accordingly, the low rotational speed gear module 10 enables a motionless state and achieves a large torque.

Besides, rotation of the second inner gear 21 is controlled by the first planetary gear set 3 and the second planetary gear set 5, and the second inner gear 21 has a larger circumference than a circumference of the sun gear 4, so the low rotational speed gear module 10 has a low rotational speed and a high reduction ratio.

In summary, the low rotational speed gear module can achieve anticipated objectives and solve the conventional defects. The present invention also has industrial applicability, novelty and non-obviousness, so the present invention completely complies with the requirements of patentability. Therefore, a request to patent the present invention is filed pursuant to patent law. Examination is kindly requested, and allowance of the present application is solicited to protect the rights of the inventor.

What is claimed is:

1. A low rotational speed gear module, comprising:
   a fixed tube member (1) including a first inner gear (11);
   a rotational sleeve (2) disposed corresponding to the fixed tube member (1) and rotatable with respect to the fixed tube member (1), the rotational sleeve (2) including a second inner gear (21), the first inner gear (11) and the second inner gear (21) together defining an accommodating space (s) inside them;

a first planetary gear set (3) received in the accommodating space (s), the first planetary gear set (3) including a fixing plate (31), a plurality of first planetary gears (32) fixed to one side of the fixing plate (31), and a driven gear (33) fixed to the other side of the fixing plate (31);

a sun gear (4) disposed among the first planetary gears (32), each of the first planetary gears (32) being engaged at one side with the sun gear (4) and engaged at another side with the first inner gear (11), so that the driven gear (33) is rotated by rotation of the first planetary gears (32); and a second planetary gear set (5) disposed around the driven gear (33), the second planetary gear set (5) including a plurality of second planetary gears (51), each of the second planetary gears (51) being engaged at one side with the driven gear (33) and engaged at another side with the first inner gear (11) and the second inner gear (21), so that the rotational sleeve (2) is rotated by rotation of the driven gear (33);

wherein the fixed tube member (1) includes an outer sleeve (12) and an inner sleeve (13) inserted inside the outer sleeve (12), the first inner Gear (11) includes a first inner rind gear (121) inside the outer sleeve (12) and a second inner ring gear (131) inside the inner sleeve (13), the second planetary gears (51) are engaged with the first inner ring gear (121), and the first planetary gears (32) are engaged with the second inner ring gear (131).

2. The low rotational speed gear module according to claim 1, wherein the fixed tube member (1) further includes a first cover plate (15) and a second cover plate (16), the outer sleeve (12) has two openings (123) at its two ends, the first cover plate (15) and the second cover plate (16) cover the two openings (123) respectively.

3. The low rotational speed gear module according to claim 2, wherein the inner sleeve (13) is disposed between the first cover plate (15) and the first inner ring gear (121), and the rotational sleeve (2) is disposed between the second cover plate (16) and the first inner ring gear (121).

4. The low rotational speed module according to claim 3, wherein the first cover plate (15) includes a first through hole (151), the sun gear (4) includes an insertion hole (41), and the first through hole (151) is disposed corresponding to the insertion hole (41).

5. The low rotational speed module according to claim 3, further comprising at least one bearing (6), the second cover plate (16) including a second through hole (161), a shaft (22) being extended from the rotational sleeve (2), the shaft (22) being inserted through the second through hole (161) and exposed from the same, the bearing (6) being clamped between an inner surface of the second through hole (161) and the shaft (22).

6. The low rotational speed module according to claim 2, wherein the fixed tube member (1) further includes a plurality of fastening elements (14), the outer sleeve (12) includes a plurality of first fastening holes (122), the inner sleeve (13) includes a plurality of second fastening holes (132), and each of the fastening elements (14) is inserted and fastened to a respective corresponding one of the first fastening holes (122) and a respective corresponding one of the second fastening holes (132).

7. The low rotational speed module according to claim 1, wherein the second planetary gear set (5) further includes two clamping plates (52), the second planetary gears (51) are arranged in a circular manner at equal distances from each other, and the second planetary gears (51) are interposed between the two clamping plates (52) and are pivotally connected to the two clamping plates (52).

8. The low rotational speed module according to claim 1, wherein the first planetary gears (32) are arranged in a circular manner at equal distances from each other, and the first planetary gears (32) are fixed to the fixing plate (31).

9. A low rotational speed gear module, comprising:
a fixed tube member (1) including a first inner gear (11);
a rotational sleeve (2) disposed corresponding to the fixed tube member (1) and rotatable with respect to the fixed tube member (1), the rotational sleeve (2) including a second inner gear (21), the first inner gear (11) and the second inner gear (21) together defining an accommodating space (s) inside them;
a first planetary gear set (3) received in the accommodating space (s), the first planetary gear set (3) including a fixing plate (31), a plurality of first planetary gears (32) fixed to one side of the fixing plate (31), and a driven gear (33) fixed to the other side of the fixing plate (31);
a sun gear (4) disposed among the first planetary gears (32), each of the first planetary gears (32) being engaged at one side with the sun gear (4) and engaged at another side with the first inner gear (11), so that the driven gear (33) is rotated by rotation of the first planetary gears (32); and
a second planetary gear set (5) disposed around the driven gear (33), the second planetary gear set (5) including a plurality of second planetary gears (51), each of the second planetary gears (51) being engaged at one side with the driven gear (33) and engaged at another side with the first inner gear (11) and the second inner gear (21), so that the rotational sleeve (2) is rotated by rotation of the driven gear (33);
wherein the second planetary gear set (5) further includes two clamping plates (52), the second planetary gears (51) are arranged in a circular manner at equal distances from each other, and the second planetary gears (51) are interposed between the two clamping plates (52) and are pivotally connected to the two clamping plates (52);
wherein one of the clamping plates (52) includes an open hole (521), and the driven gear (33) is inserted in the open hole (521).

* * * * *